April 5, 1960 F. EGGLETON 2,931,563
CONSTRUCTION OF AXIAL FLOW COMPRESSORS
Filed Sept. 10, 1956 10 Sheets-Sheet 1
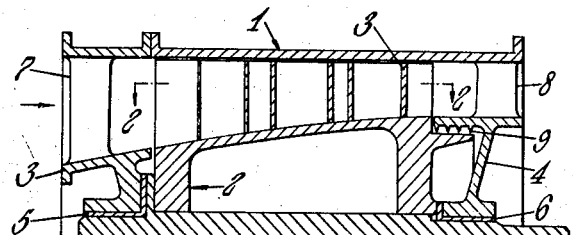
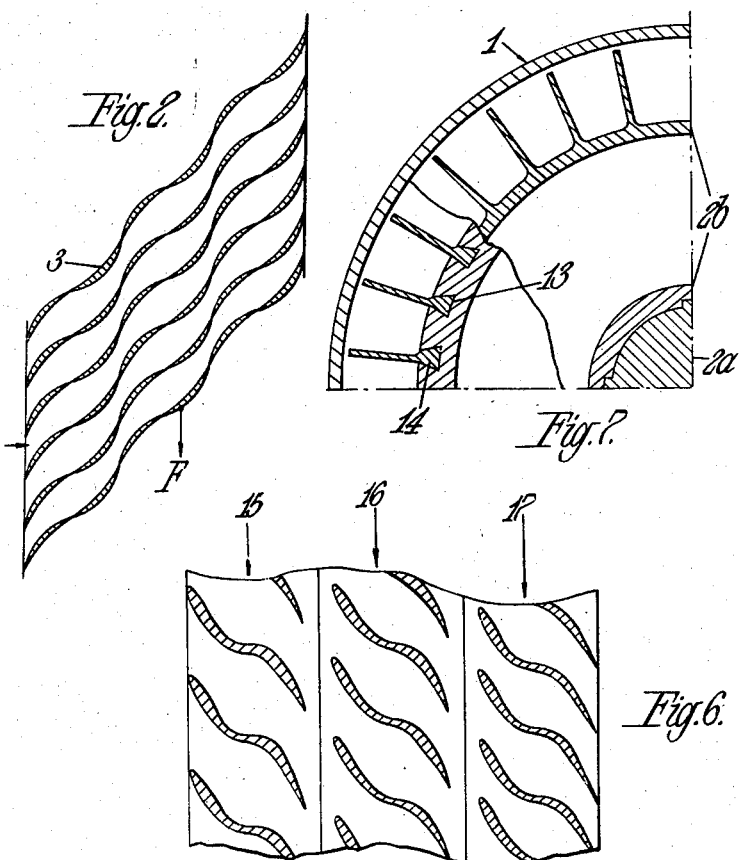
Inventor
F. Eggleton

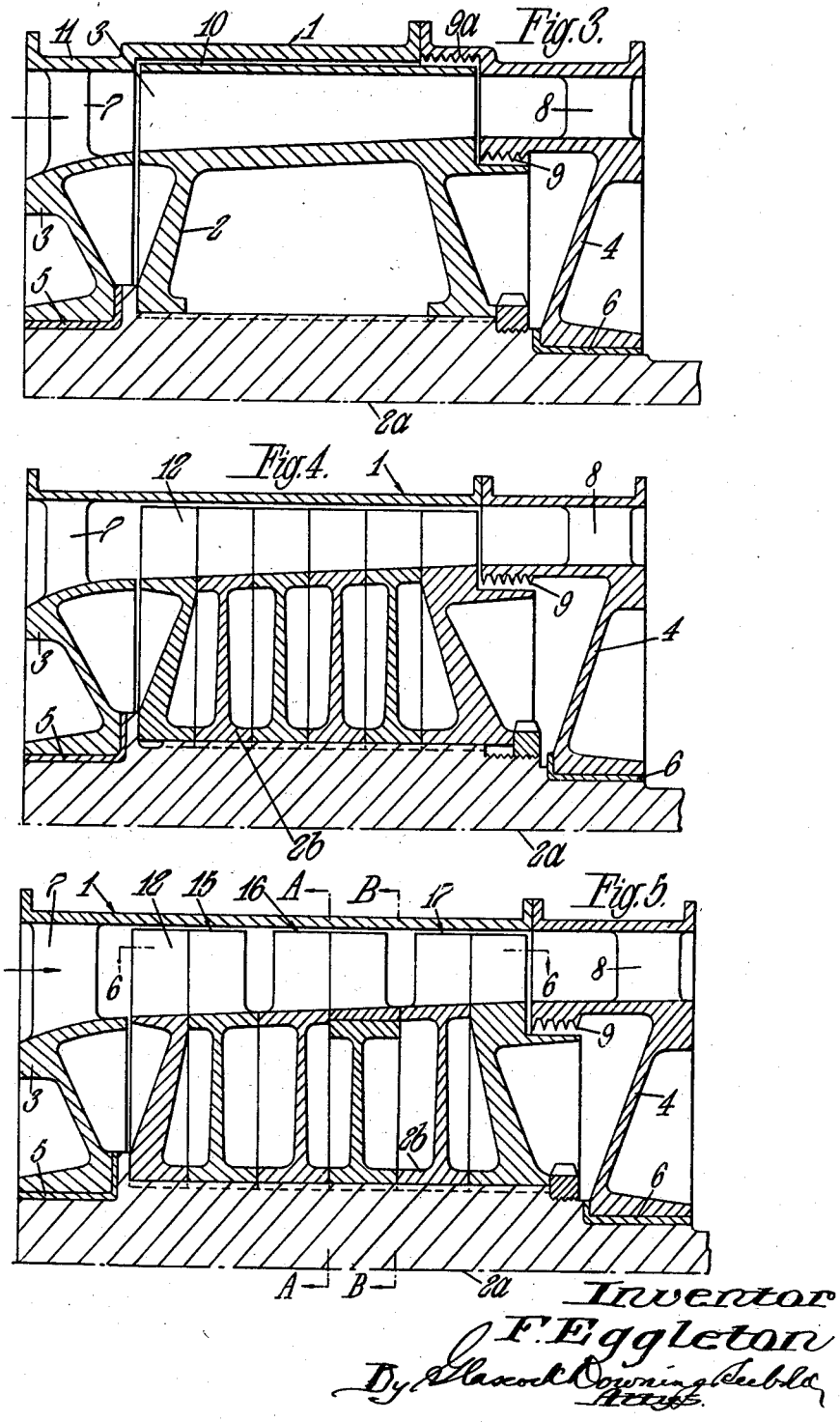

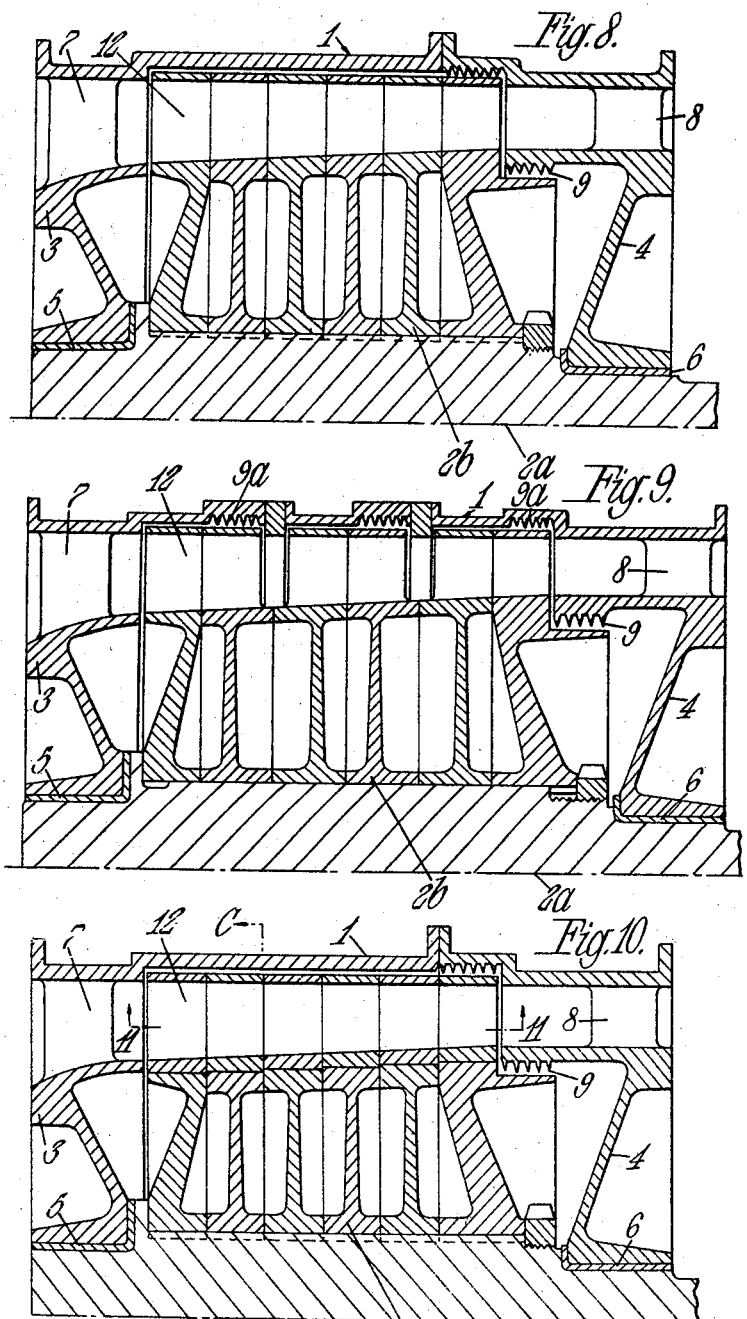

April 5, 1960   F. EGGLETON   2,931,563
CONSTRUCTION OF AXIAL FLOW COMPRESSORS
Filed Sept. 10, 1956   10 Sheets-Sheet 4

Inventor
F. Eggleton

April 5, 1960 F. EGGLETON 2,931,563
CONSTRUCTION OF AXIAL FLOW COMPRESSORS
Filed Sept. 10, 1956 10 Sheets-Sheet 5
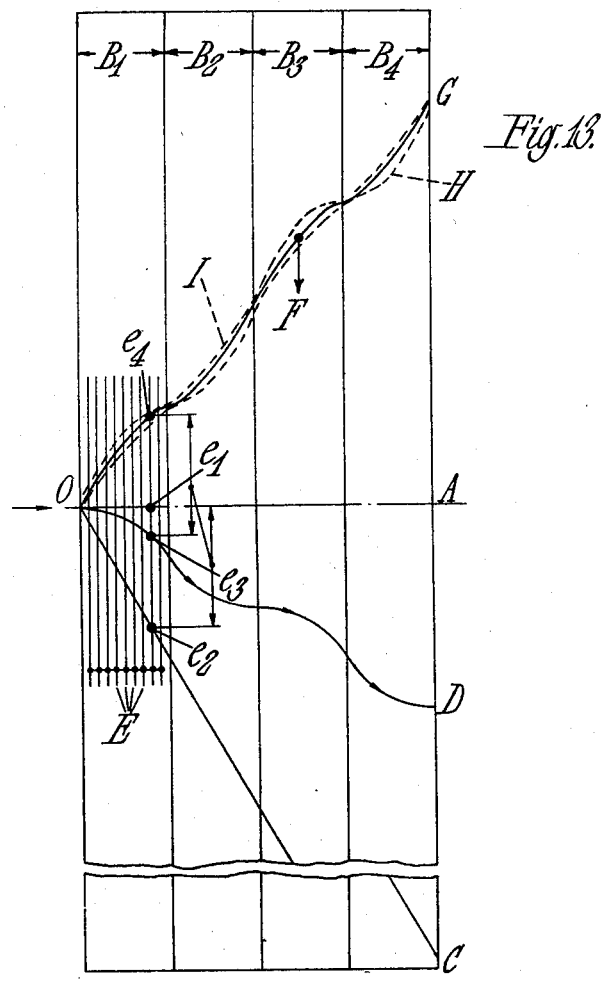

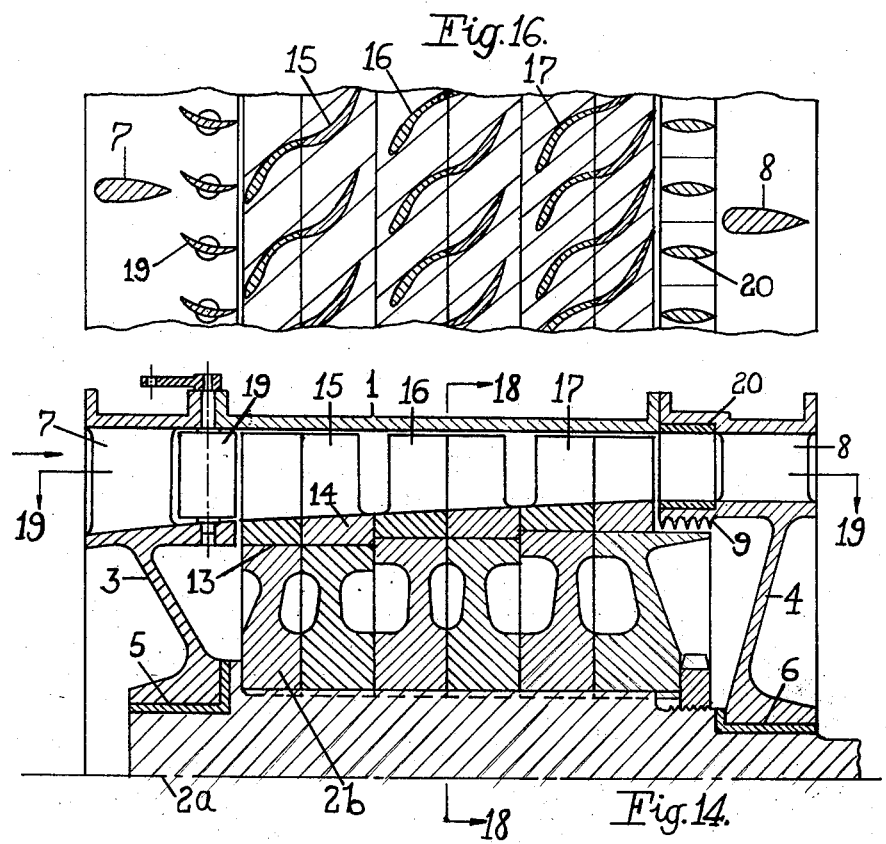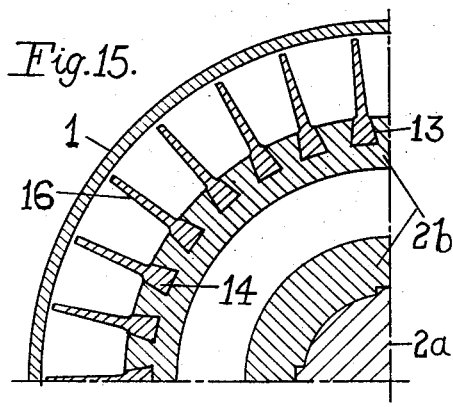

United States Patent Office 2,931,563
Patented Apr. 5, 1960

2,931,563

CONSTRUCTION OF AXIAL FLOW COMPRESSORS

Frederick Eggleton, Nelson, Lancashire, England

Application September 10, 1956, Serial No. 608,784

Claims priority, application Great Britain
September 19, 1955

4 Claims. (Cl. 230—122)

This invention concerns axial flow fluid devices such as the provision of compressors and has for an object an improved construction which will eliminate or reduce some of the inherent losses in existing forms of such machines.

Hitherto in the design of axial flow compressors, rings of blades have been provided around the internal periphery of a substantially cylindrical housing or stator, and on a rotor mounted for rotation co-axially within the stator, the blade rings being provided on the stator and the rotor alternately along the length of the device. The rings of moving and fixed blades thus alternate along the length of the compressor, each pair of successive rings of moving and fixed blades constituting a stage of the machine. In this construction, not only is it necessary to provide radial clearance between the tips of the blades and the stator housing but also axial clearance between the adjacent radial inlet and outlet edges thereof. These clearances are customarily held to close limits to ensure the minimum of loss, and demand a high degree of accuracy of machining of all the relatively moving members including the rotor bearings which serve to locate the rings of moving blades accurately between the rings of stator blades. Accordingly it is a further object of the present invention to provide a construction in which the number of relatively moving members between which accurate clearances have to be maintained, is reduced, thereby simplifying construction and reducing energy losses due to turbulent fluid flow which may occur in the clearance gaps.

In a compressor, the fluid to be compressed is admitted to the inlet end of the stator and impinges on the first row of moving blades carried on the rotor. These blades are suitably shaped to impart to the fluid a velocity which is the resultant of tangential and axial velocities. Due to the force which must be applied by the blade to accelerate the fluid, the blade also imparts to the fluid an increase in pressure energy. On leaving the first ring of moving blades, the fluid enters the first ring of fixed blades. These blades are shaped so as to change the component of tangential and some or alternatively no part of the axial velocity imparted to the fluid into pressure energy so that the fluid on leaving the first row of fixed blades impinges in a substantially axial direction and of an increased pressure on the second row of moving blades. These blades are substantially similarly shaped to the first row of moving blades and serve to impart further velocity and pressure to the fluid. The process is repeated throughout each successive stage of the compressor so that on emergence from the final row of fixed blades the fluid has a substantially axial velocity with a minimum component of tangential velocity and a high pressure.

The actual or absolute path of the fluid through such a compressor can be drawn on a diagram of the blade rings developed onto a plane and it will be seen that the fluid follows a mean path through the compressor which is in fact constituted by a cyclically repeated curve having an initial portion representing the motion of the fluid through a ring of rotor blades and a second portion representing the motion of the fluid through the stator blades for each stage of compression. This curve is generally S-shaped, and is substantially indentical for each stage. Therefore, it becomes evident that any arrangement of blades which causes the fluid to transverse such a mean path through the compressor will produce the same result and the invention aims at satisfying this condition in a relatively simple and effective manner.

In the accompanying drawings,

Figure 1 is a longitudinal half-section of an axial flow compressor having a single ring of rotor blades according to the present invention, Figure 2 is a portion of a development on a plane of a circumferentially extending section taken through the rotor blades of Figure 1 on the line 2—2, Figures 17, 4 and 20 are longitudinal half-sections similar to Figure 1 showing alternative constructional arrangements of a compressor having a single ring of rotor blades, Figures 3, 8, 10 and 21 are longitudinal half-sections similar to Figures 1, 4, 17 and 20 with ducted rotors.

Figure 13 shows diagrammatically a method of developing the datum line for the rotor blades as shown in Figure 2, Figures 5, 14 and 22 are longitudinal half sections of an axial flow compressor having a plurality of blade rings according to the present invention, each figure showing an alternative constructional arrangement and which are similar to Figures 4, 17 and 20, Figure 6 is a portion of a development on a plane of a circumferentially extending section taken through the rotor blades of Figure 5 on the line 6—6.

Figure 18:
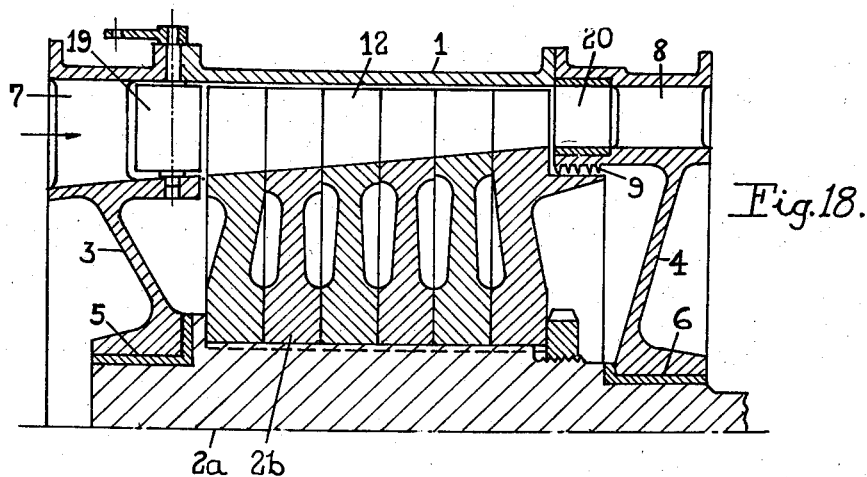
Figure 19:
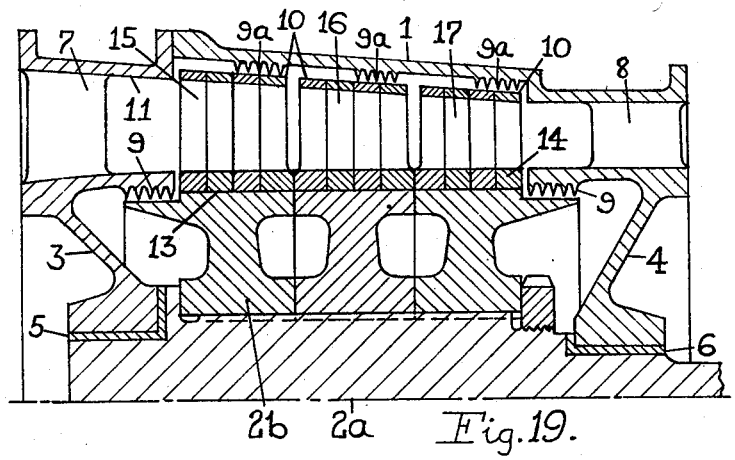
Figure 20:
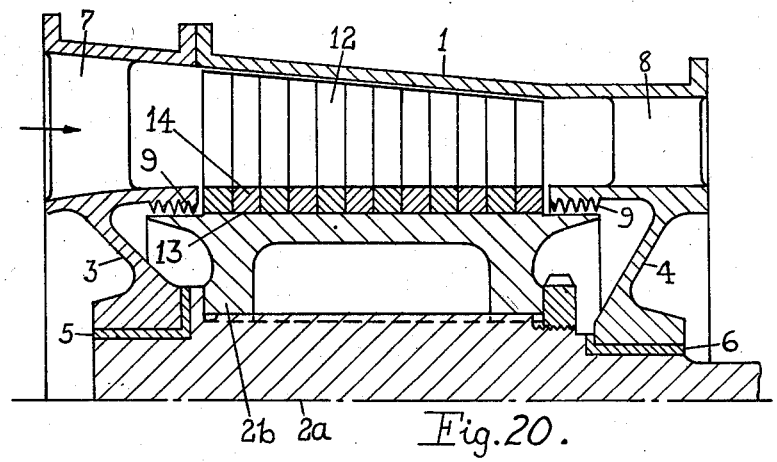
Figure 21:
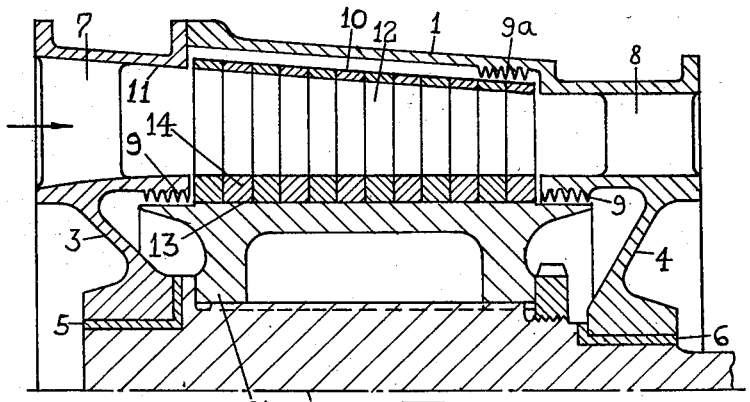
Figure 23:
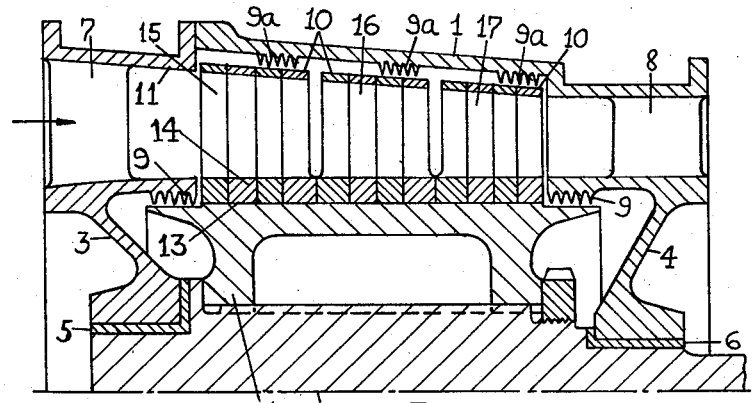
Figure 22:
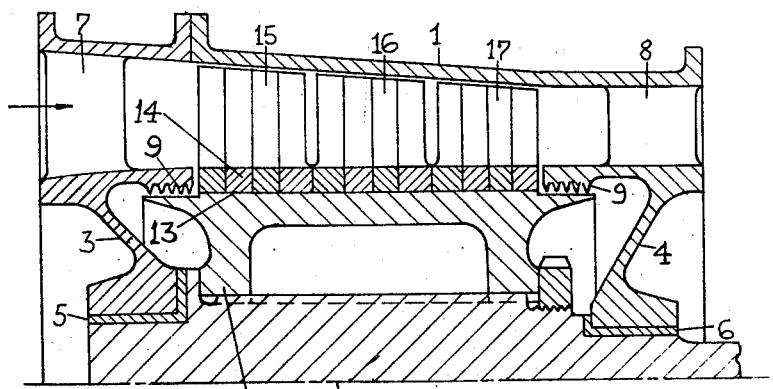

Figure 7 is a quarter section which is taken on the line 7—7 of Figure 5,

Figure 15 is a quarter section which is taken on the line 18—18 of Figure 14,

Figure 16 is a portion of a development on a plane of a circumferentially extending section taken through the spars, vanes and rotor blades of Figure 14 on the line 19—19, Figures 9, 19 and 23 are longitudinal half sections of an axial flow compressor with a plurality of ducted blade rings according to the present invention, each figure showing an alternative constructional arrangement and which are similar to Figures 5, 14 and 22, Figure 18 is a longitudinal half section of an axial flow compressor having a constructional arrangement similar to Figure 4 having inlet and outlet guide vanes and according to the invention.

For clarity and convenience of illustration, with the exception of Figure 1 the blades are not shown sectioned in the longitudinal half-sections.

In carrying the invention into effect according to one mode by way of example, an axial flow compressor, as shown in Figures 1 and 2 comprises a stator housing 1 having a relatively smooth internal surface and a rotor 2 of the "drum" type secured to a shaft 2a the rotor having a single ring of blades 12 spaced around the circumference thereof, each blade having a developed cross sectional shape formed of a continual series of an even number of aerofoil shaped portions, each portion of which is equivalent in length to a half stage of compression of the fluid and positioned on an alternately reversed curved axis or camber line and each adjacent pair of blades defining a sinuous path through the annular space between the rotor 2 and the stator housing 1 in a generally axial direction the sinuousity of the path corresponding to that of a predetermined mean path of the fluid relative to the rotor equivalent to one or more stages of compression said profile being determined in the manner hereinafter described. The rotor 2 is mounted for rotation co-axially within the stator housing 1 by means of combined bearing support and inner boundary wall members 3, 4 of the inlet and outlet ducts respectively, suitable bearings 5, 6 being interposed between the members 3, 4 and the rotor shaft 2a. The members 3, 4, are secured to the stator housing 1 by means of radially extending spars 7, 8 a suitable number of which are provided to support the members 3, 4, in position. A conventional labyrinth seal 9 is provided between the rotor 2 and the member 4 to reduce the loss of fluid to a minimum. Means are provided (not shown) for rotating the rotor shaft 2a in the direction shown by the arrow F in Figure 2 such that fluid is drawn into the compressor at the left hand end of Figure 1 and is expelled at a higher pressure at the other end in conventional manner, the annular space between the rotor and the stator housing decreasing from left to right as shown in Figure 1 to accommodate the decrease in volume accompanying the increase in pressure.

The design may be modified as shown in Figure 3 by attaching an annular rim 10 to the tips of the blades such that the rim 10 rotates with the blades and forms an outer boundary wall to the fluid passages, the stator housing being formed of decreased radius 11 at the inlet end to form a "ducted" system. A second labyrinth seal 9a is inserted between the stator housing and the rim 10.

Figure 17:
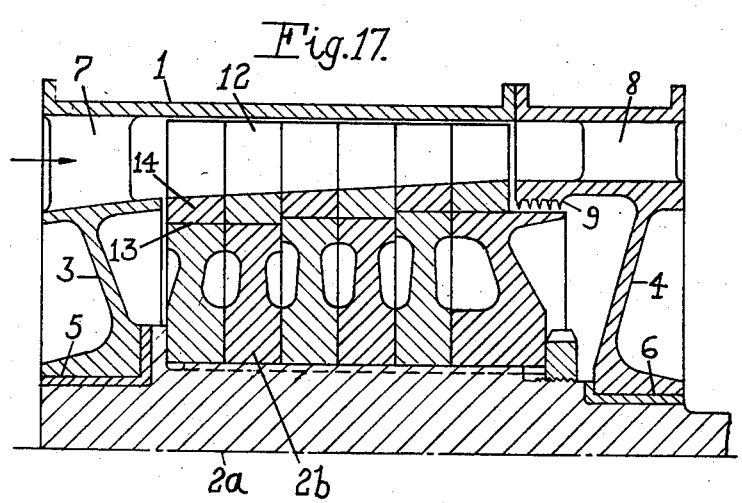

In a further modification as shown in Figure 4 the "drum" type rotor of Figure 1 has been replaced by one of the "disc" type in which parts of the blade ring 12 are provided on separate rotor discs 2b which discs are mounted and clamped in the desired alignment on the shaft 2a to form a rotor having one blade ring. The blades may, as shown in Figure 4, be formed integrally with the disc centres or alternatively as Figure 17 separate blades may be attached in suitable manner to the rotor discs similar to as shown in Figures 15 and 17. Each part of the blade ring 12 may be equivalent to one or more stages of compression, or alternatively it may be equivalent to only a part of one stage of compression.

In a still further modification of an axial flow compressor according to the present invention, as shown in Figures 5, 6 and 7, the rotor is of the disc-type construction having the blades integral with the rotor discs or alternatively as Figure 14 by having the blades secured to the discs in conventional manner by means of a keyway 13 cooperating with a suitably shaped blade root 14 (as shown in Figure 15). The Figures 5, 6 and 7 show a compressor designed with a rotor unit compounded from three spaced blade rings 15, 16, 14, each blade ring corresponding to one stage of compression, thus enabling the number of blades in a ring to be increased for successive blade rings of the rotor to conform to a given space to thickness ratio, though of course any number of blade rings may be employed each corresponding to one or more stages of compression.

A still further modification is shown in Figure 8, having a disc-type rotor construction in which each blade ring has an annular rim secured to the tips of the blades to form a "ducted" system. As shown in the drawing, parts of the blade ring and annular rim are formed integrally with the disc-type centres.

The arrangement shown in Figure 9 is similar to Figures 5, 6 and 7 in that the rotor unit comprises three spaced blade rings, each blade ring corresponding to one or more stages of compression but has been modified by the attachment of annular rims to the tips of the blades to form a "ducted" system.

Figure 11:
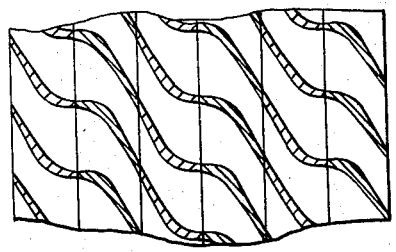
Figure 11 is a portion of a development on a plane of a circumferentially extending section taken through the rotor blades of Figure 10 on the line 11—11.
Figure 12:
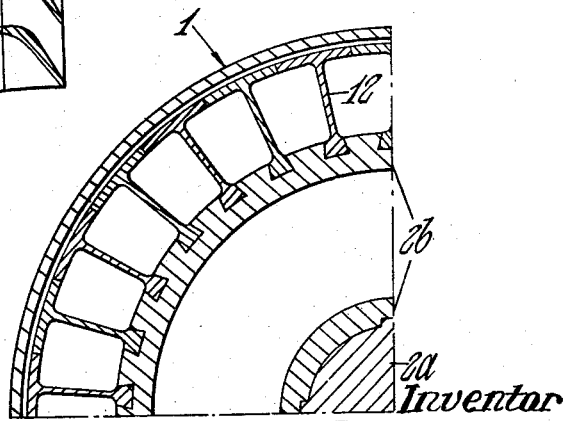
Figure 12 is a quarter section taken on the line C—C of Figure 10.

The still further modified arrangement shown in Figures 10, 11 and 12 has a rotor of disc-type construction together with a ducted system in which arrangement each part of a blade is secured to, or integral with, a segment of an annular rim such that when the blades are fitted to the rotor disc the annular segments abut to form the annular rim. Conveniently the annular segments may be approximately parallelogram-shaped in plan view as shown in Figure 11.

This method of forming the annular rim with segments attached to each blade may equally well be applied to a rotor with a plurality of blade rings as shown in Figure 19.

The design may be further modified by the use of a blade ring 19 attached to the stator housing in front of the rotor blades at the inlet end and another blade ring 20 similarly attached at the outlet end as shown in Figures 14, 16 and 18 to ensure that the fluid entering and leaving the rotor does so in the manner as required by the design.

In the execution of one mode of design of a compressor according to the invention by way of example, the designer first selects the radii at which it is desired to plot the contour of the blades and developes these sections on planes. Usually three or four sections will be found to be sufficient. On each of the plane sections, one of which is shown in Figure 13, an axial datum line OA is sub-divided at intervals to form intercepts of lengths $B_1$, $B_2$, $B_3$, $B_4$ representing the axial lengths of corresponding half stages of the compressor. The first intercept $B_1$ represents the axial length of the first ring of rotor blades forming the first half of the first stage of compression, whilst the second $B_2$, represents the axial length of the second half of the first stage—equivalent to the first ring of stator blades—and similarly for subsequent stages.

From the given design data (axial velocity of the fluid and the tangential velocity of the rotor), a graph OC is drawn to full scale on each of the developed sections, starting from zero 0 at the inlet end of the axial datum line to represent the circumferential displacement of the blades on their particular developed section. On each section the perpendicular distance between any point on the circumferential displacement line OC and the axial datum line OA, represents the circumferential displacement of the blade section during the time it would take an imaginary particle of the fluid to travel an axial distance equal to the length of the datum line from zero 0 to the point of measurement of circumferential displacement on the datum line. Where a constant axial velocity of the fluid through the compressor is assumed, the displacement line OC of the graph forms the hypotenuse of a right angled triangle with the datum line OA as the base and the maximum circumferential displacement line as the perpendicular. Lines are then drawn perpendicular to the axial datum line OA at each of the sub-divisions defining the intercepts representing each half stage, the perpendiculars intersecting the plotted circumferential displacement line OC of the graph.

On each of the developed sections, the centre line OD of the mean of the absolute path of the fluid through the compressor is drawn, starting from zero at the apex O of the graph of circumferential displacement OC at the inlet end. This mean path is constructed from the design data. Usually the mean path over each rotor half stage $B_1$, $B_3$, will be that produced by a blade accelerating the fluid in a tangential direction at a constant rate whilst the mean path over each equivalent stator half stage $B_2$, $B_4$ will be that produced by a blade retarding the fluid in a tangential direction at a constant rate from the maximum tangential or whirl velocity at the rotor blade outlet to a minimum value at the equivalent stator blade outlet. The centre line OD of mean of the absolute path of the fluid through a complete stage would thus be of an S-form with the tangents to the curve at the outlet and inlet ends of the stage parallel to each other, and usually, but not necessarily, parallel to the axial datum line OA.

Each half stage of the axial datum line OA on each developed section is then sub-divided at short intervals into any convenient number of parts (short lengths allowing the developed lines to be more accurately plotted) by lines E perpendicular to the axial datum line OA, which intercept both the circumferential displacement line OC and the centre line OD of mean of the absolute path of the fluid. The distance on one of these perpendicular lines, between the axial datum line OA and the circumferential displacement line OC is measured $e_1—e_2$ and is set off in a direction opposite to that of the motion of the blade F starting from the point of intersection $e_3$ of the same perpendicular line with the centre line OD of mean of the absolute path of the fluid. A point $e_4$ is thus plotted which lies on a curve representing the relative datum line OG of the rotor and equivalent stator blade at the particular radius at which the section is being developed.

The procedure is repeated for each perpendicular line E for each stage across the developed section, so that the curve OG is formed which is the counterpart of the centre line OD of mean of the absolute path of the fluid through the compressor, but which is differently directed with respect thereto. On each of the developed sections these latter or developed curves OG represent the shape referred to the rotor of the datum lines of a single blade. Similar datum lines are developed for other blades.

It will thus be seen that if the rotor is provided with a ring of blades each blade comprising a continuous wall extending for one or more stages of compression and having the developed datum lines OG as axes on their particular section which sections are to be developed in the manner hereinafter described and such a rotor or such rotors clamped together are rotated in the direction shown by F at the speed to give the designed tangential velocity i.e. that used when drawing the circumferential displacement line OC, the successive portions of the wall will act in exactly the same way as the successive rotor and stator blade rings in the conventional type of compressor.

Although it has been stated above that the absolute mean path of the fluid through the rotor and equivalent stator portions of the blades would be that which would be produced by blades accelerating and retarding the fluid in a tangential direction at a constant rate, a variable rate may be adopted if desired.

The relative or actual wall contour H, I, of a blade is preferably developed in a similar manner to the relative datum lines or axes of the blades from absolute contours drawn on the centre lines OD of mean of the absolute path of the fluid.

In action the rotor blade portion of a stage of compression does work in transferring pressure and velocity energy to the fluid exactly as the rotor blade of an existing type compressor, but the equivalent stator blade portion whilst performing the duty of changing the tangential velocity or kinetic energy of the fluid into pressure energy similarly to the stator blade of an existing type compressor, it does this duty in a different way and its action is as follows:

First it is necessary to explain that if the tangential acceleration of the fluid by the rotor blade portion of a stage is continued at the same rate up to its outlet end the intensity of pressure of the fluid measured circumferentially and radially at its outlet would vary. Due to the force causing the change in rate of the whirl velocity of the fluid, the pressure gradient measured circumferentially across the fluid passage at the outlet would be from a maximum on the front side of a blade and decrease in the direction as of the motion of the blades across the fluid passage to a minimum at the rear side of the adjacent blade. The intensity of pressure of the fluid measured at any point on a circumferential line across the fluid passage at the outlet would be dependent upon its distance on that line from the rear face of the blade and also the fluid density. The latter would vary with its temperature. Due to the force causing the change in direction of the fluid the pressure gradient radially across the fluid passage at the outlet would be from a maximum at the maximum radius to a minimum at the minimum radius. The intensity of pressure measured at any point on a radial line across the fluid passage at the outlet would be proportionate to its distance on that line from the root radius of the blades.

A knowledge of the pressure gradients described above is very important in understanding why the equivalent stator blade portion of a stage does not act as a turbine blade and extract energy from the fluid whilst rotating in the same direction and at the same speed as the rotor portion. It is also important, that if there is any variation in the rate of tangential acceleration of the fluid, the maximum rate should be at the outlet end of the rotor portion of the blade.

The equivalent stator portion of the blade due to its shape reduces the whirl or tangential velocity of the fluid so that at its outlet end the velocity of the fluid is substantially axial. The rate of retardation of the fluid in a tangential direction is usually the same as the acceleration rate of the rotor portion but if there is any variation it is important that the retardation rate at the inlet end should be exactly the same on the same radius as the acceleration rate at the outlet to the rotor portion of the same stage of compression. The necessity for the latter statement is to ensure an instantaneous change in direction of the tangential accelerating force acting on the fluid. It is also important that the fluid leaves the outlets to the equivalent stator portions of the blades without having a pressure gradient circumferentially across the fluid passages. To ensure this a small part of the axes of the equivalent stator portions at the outlet end should be straight.

Assuming the fluid at the inlets to the equivalent stator portion of the blades not to have any pressure gradient circumferentially across the fluid passages, the result of the retardation of the fluid in a tangential direction by the equivalent stator portion of the blades would be to produce such a pressure gradient. The gradient in pressure would be from a maximum on the rear side of a blade and decrease in a direction opposite to that of the motion of the blades circumferentially across the fluid passage to a minimum at the front side of the adjacent blade. The intensity of pressure of the fluid measured at any point on a circumferential line across the fluid passage would be dependent upon its distance on that line from the front side of the blade and the fluid density. The latter would vary with its temperature.

If the pressure gradient circumferentially across a fluid passage at the outlet to the rotor portion of the blades is taken into account, it will be seen, that the effect of the tangenial retardation of the fluid by the equivalent stator portion of the blades is to reduce this gradient. It will thus be seen, that by a careful selection of the circumferential width of the fluid passages through the equivalent stator portion of the blades, that the fluid pressure acting at points opposite each other on the two sides of the same blade can be made approximately equal to each other. The total pressure loads acting on opposite sides of the same blade can also be made to equal each other so that no torque would be required to be applied to the rotor to rotate the equivalent stator portion of the blades at their designed speed. The radial pressure gradient across the fluid passages at the outlets to the rotor portion of the blades would decrease during the fluids passage through the equivalent stator portion of the blades proportionately to the decrease in whirl velocity of the fluid so that at the outlets to the equivalent stators the fluid would have a pressure substantially constant and of a greater intensity than that of the mean intensity of pressure of the fluid at the outlet to the rotor portion of the blades of the same stage of compression. This process would be repeated for each stage through the compressor with corresponding increases in pressure of the fluid.

Considering the compressor it is recommended that it should be designed on the basis of the changes in momentum but if it is desired the aerodynamical method where use is made of values for the "Lift" and "Drag" of particular aerofoils can also be used. If use is made of the latter method it is important that the two surfaces of the aerofoils acting as equivalent stators should be considered separately so that the different pressures of the fluid leaving the two sides of the rotor aerofoils can be taken into account. It is also very important that any joints between the tails of the rotor aerofoils and the noses of the equivalent stator aerofoils axially adjacent to them occurring in a stage of compression should be tight enough to maintain the pressure difference across them.

The design of the contour of the fluid passages between the blades will decide the shape of the blades and allowance must be made for the variation of the pressure and thus the density of the fluid. The centre line of mean of the absolute path of the fluid would not be at the linear centre of a passage on any circumferential section except where there is no pressure gradient circumferentially across it thus the contour of the blades would not be symmetrically disposed about the relative datum lines or axes of the blades.

I claim:

1. An axial flow compressor of one or more cycles or stages of operation comprising a stator housing, a rotor mounted for rotation co-axially within said housing, a plurality of circumferentially spaced rotor blades provided on the rotor, said blades extending in a generally radial direction for substantially the axial length of the rotor each blade having a developed cross sectional shape formed of a continual series of an even number of aerofoil shaped portions, each portion of which is equivalent in length to a half stage of compression of the fluid positioned on an alternately reversed curved axis or camber line, each adjacent pair of rotor blades defining a continuous sinuous fluid passage in a direction generally axially of the rotor through the annular space between the rotor and the stator housing, the sinuousity of the path being such as to cause the fluid flowing through the fluid passage to be alternatively accelerated and retarded in each stage in a tangential direction to cause the compression of the fluid, means for rotating the said rotor, fluid inlet means at one end of the stator housing for admitting fluid into said annular space, and fluid outlet and means at the other end of the stator housing.

2. An axial flow compressor as claimed in claim 1 wherein an annular rim is provided on the outer extremities of the rotor blades to form an outer boundary wall to the fluid passages.

3. An axial flow compressor of one or more cycles or stages of operations comprising a stator housing, two or more blade rings mounted in spaced axial alignment for rotation co-axially within said housing, said blades extending in a generally radial direction for substantially the axial length of the rotor each blade of each blade ring having a developed cross sectional shape formed of a continual series of an even number of aerofoil shaped portions each portion positioned on an alternately reversed curved axis or camber line and each adacent pair of rotor blades on each blade ring defining a continuous sinuous fluid passage, in a direction generally axially of the rotor through the annular space between the rotor and the stator housing, the sinuosity of the path being such as to cause the fluid flowing through the fluid passage to be alternatively accelerated and retarded in each stage in a tangential direction to cause the compression of the fluid, means for rotating the said rotor, fluid inlet means at one end of the stator housing for admitting fluid into said annular space and fluid outlet means at the other end of the stator housing.

4. An axial flow compressor as claimed in claim 3 wherein an annular rim is provided on the outer extremities of the rotor blades of each blade ring to form outer boundary walls to the fluid passages.

References Cited in the file of this patent
UNITED STATES PATENTS

| | | |
|---|---|---|
| 1,316,139 | Cake | Sept. 16, 1919 |
| 2,611,532 | Ljungstrom | Sept. 23, 1952 |
| 2,716,165 | Thomas | June 7, 1955 |